United States Patent
Reese et al.

(10) Patent No.: US 7,043,710 B2
(45) Date of Patent: May 9, 2006

(54) METHOD FOR EARLY EVALUATION IN MICROPIPELINE PROCESSORS

(75) Inventors: Robert B. Reese, Starkville, MS (US); Mitchell A. Thornton, Dallas, TX (US)

(73) Assignee: Mississippi State University, Mississippi State, MS (US)

( * ) Notice: Subject to any disclaimer, the term of this patent is extended or adjusted under 35 U.S.C. 154(b) by 292 days.

(21) Appl. No.: 10/774,599

(22) Filed: Feb. 10, 2004

(65) Prior Publication Data

US 2004/0225699 A1    Nov. 11, 2004

Related U.S. Application Data

(60) Provisional application No. 60/446,987, filed on Feb. 13, 2003.

(51) Int. Cl.
*G06F 17/50* (2006.01)
*G06F 9/45* (2006.01)

(52) U.S. Cl. .......................... 716/6; 708/233

(58) Field of Classification Search ............ 716/4, 716/6; 708/233, 300–316; 703/13–19; 714/700, 714/812–824; 626/93

See application file for complete search history.

(56) References Cited

U.S. PATENT DOCUMENTS

| 6,229,865 B1 * | 5/2001 | Yeo ............................. 375/375 |
| 6,590,424 B1 * | 7/2003 | Singh et al. .................. 326/93 |
| 6,894,953 B1 * | 5/2005 | Otto ........................... 368/113 |
| 6,956,422 B1 * | 10/2005 | Reilly et al. ................ 327/261 |

OTHER PUBLICATIONS

Ivan E. Sutherland, "Micropipelines", Communications of the ACM, vol. 32, No. 6, Jun. 1989, pp. 720-738.

D. E. Muller, et al., "A Theory of Asynchronous Circuits", Proc. Int. Symp. On Theory of Switching, vol. 29, pp. 204-243 (1959).

M. E. Dean, et al., "Efficient Self-Timing with Level-Encoded 2-Phase Dual-Rail (LEDR)", Advanced Research in VLSI (1991).

D. H. Linder, et al., "Phased Logic: Supporting the Synchronous Design Paradigm with Delay Insensitive Circuitry", IEEE Transactions on Computers, vol. 45, No. 9, Sep. 1996.

F. Commoner, et al., "Marked Directed Graphs", J. Computer and Systems Sciences, vol. 5, pp. 511-523 (1971).

* cited by examiner

*Primary Examiner*—Vuthe Siek
*Assistant Examiner*—Nghia M. Doan
(74) *Attorney, Agent, or Firm*—DLA Piper Rudnick Gray Cary US LLP

(57) ABSTRACT

A system and method for early evaluation in micropipeline processors to improve performance is provided. The present invention presents a design methodology where a micropipeline processor block (e.g., a binary full adder) is capable of computing a result based on the arrival of only a subset of inputs. In general, early evaluation allows micropipeline processor blocks to operate in parallel, where they might otherwise operate sequentially because of data arrival dependencies; thereby improving performance of the micropipeline processors.

20 Claims, 3 Drawing Sheets

METHOD FOR EARLY EVALUATION IN MICROPIPELINE PROCESSORS

This application claims priority from U.S. Provisional Application No. 60/446,987, filed Feb. 13, 2003. The entirety of that provisional application is incorporated herein by reference.

This invention was made with Government support under CCR-0098272 awarded by the National Science Foundation. The Government may have certain rights in the invention.

BACKGROUND OF THE INVENTION

1. Field of the Invention

The present invention relates to an asynchronous design methodology known as phased logic and in particular, a technique called early evaluation that can be used to increase performance of such self-timed systems.

2. Related Art

Pipeline processors are known, high speed computing machinery which have separate stages that can operate concurrently. They can be found in graphics processors, signal processing devices, arithmetic integrated circuit components and instruction interpretation units. In general, pipeline processors operate on data as it passes along them. Thus, the latency of a pipeline is measured in terms of the time it takes a single data value to pass through it. Further, the throughput rate of a pipeline processor is a measure of how many data values can pass through it per unit time.

Pipeline processors both store and process data (i.e., they comprise alternating storage elements and processing logic). Further, pipelines processors can be clocked (i.e., their parts act in response to an external clock) or event-driven (i.e., their parts act independently whenever local events dictate).

Pipeline processors can be characterized as inelastic and elastic. Inelastic pipeline processors have a fixed amount of data. Thus, the input rate and the output rate of an inelastic pipeline exactly match. An inelastic pipeline, when not considering any processing logic, acts like a shift register.

Elastic pipeline processors have a varying amount of data in them. Thus, the input rate and the output rate of an elastic pipeline may differ momentarily because of internal buffering. Not considering any processing logic, an elastic pipeline processor behaves as a flow-through, first-in-first-out (FIFO) memory.

In I. E. Sutherland, "Micropipelines," Communications of the ACM, Vol. 32, No. 6, June 1989, pp. 720–738 [hereinafter Sutherland], which is hereby incorporated by reference in its entirety, a micropipeline processor design methodology was first introduced. Sutherland defined a "micropipeline processor" (or simply, "micropipeline") as: "[A] particularly simple form of event-driven, elastic pipeline with or without internal processing. The micro part of this name seems appropriate . . . because micropipelines contain very simple circuitry, because micropipelines are useful in very short lengths, and because micropipelines are suitable for layout in microelectronic form."

The described micropipeline design methodology in Sutherland was offered as a solution for designing asynchronous, very large scale integration (VLSI) circuits and addressed the limitations of the clocked-logic conceptual framework commonly used in the design of digital systems. That is, there was a "need [for] a new conceptual framework because the complexity of VLSI technology ha[d] reached the point where design time and design cost often exceed[ed] fabrication time and fabrication cost."

Micropipelines are a self-timed methodology that uses bundled data signaling, and Muller C-elements for controlling data movement between pipeline stages as described in D. E. Muller and W. S. Bartky, "A Theory of Asynchronous Circuits", Proc. Int. Symp. on Theory of Switching, vol. 29, pp. 204–243 (1959) [hereinafter Muller], which is hereby incorporated by reference in its entirety.

"Bundled data signaling" refers to signaling where a group of wires represents the data, and a single control wire is used to indicate the presence of valid data. The control wire is said to be bundled with the data, hence the term "bundled data signaling." In micropipelines, it is assumed that the delay of the control path is matched to the delay of the data path. This delay matching includes the wiring delay between micropipeline stages.

In M. E. Dean et al., "Efficient Self-Timing with Level-Encoded 2-Phase Dual-Rail (LEDR)," Advanced Research in VLSI (1991) [hereinafter Dean], which is hereby incorporated by reference in its entirety, LEDR signaling was introduced as a method for providing delay insensitive signaling for micropipelines. The term "phase" is used in Dean to distinguish successive computation cycles in the LEDR micropipeline, with the data undergoing successive even and odd phase changes.

The LEDR micropipeline systems were all linear pipelined data paths, with some limited fork/join capability also demonstrated, but with no indication of how general digital systems could be mapped to these structures. This problem was solved in D. H. Linder and J. C. Harden, "Phased Logic: Supporting the Synchronous Design Paradigm with Delay Insensitive Circuitry," IEEE Transactions on Computers, Vol 45, No 9, September 1996 [hereinafter Linder], which is hereby incorporated by reference in its entirety, via a methodology termed "Phased Logic" (or "PL").

PL uses marked graph theory, as described in F. Commoner, A. W. Hol, S. Even, A. Pneuel, "Marked Directed Graphs," J. Computer and System Sciences, vol. 5, pp. 511–523, 1971 [hereinafter Commoner], which is hereby incorporated by reference in its entirety, as the basis for an automated method for mapping a clocked netlist composed of D-Flip-Flops, combinational gates and clocked by a single global clock to a self-timed netlist of PL gates. Logically, a PL gate is simply a micropipeline block with the state of the Muller C-element known as the "gate phase," which can be either even or odd. A PL gate is said to "fire" (i.e., the Muller C-element changes state) when the phase of all data inputs match the gate phase. This firing causes the output data to be updated with the result of the computation block of the gate.

The term "coarse-grain" is used in the relevant art(s) to refer to a PL gate that has multiple outputs, has a compute function composed of multiple gates, and uses bundled data signaling for the inputs. The term "fine-grain" is used is used in the relevant art(s) to refer to a PL gate that has only one output, a compute function composed of a single logic function, and which uses LEDR signaling for data.

Notwithstanding the advances detailed above, a primary deficiency of micropipelines remains. That is, micropipelines remain slower than clocked pipelines because of the extra latency in the forward path. No systems exits which allow a micropipeline block to compute a result based on the arrival of only a subset of inputs due to data arrival dependencies.

Given the foregoing, what is needed is a system and method for early evaluation in micropipeline processors to improve performance.

SUMMARY OF THE INVENTION

The present invention meets the above-identified needs by providing a system and method for early evaluation in micropipeline processors to improve performance.

In an embodiment, the present invention provides a system and method which allows micropipelines to operate faster than clocked systems by allowing a micropipeline block to compute a result based on the arrival of only a subset of inputs. In general, early evaluation allows micropipeline blocks to operate in parallel, where they might otherwise operate sequentially because of data arrival dependencies. This can improve performance of the micropipeline.

An advantage of the present invention is that the asynchronous design methodology of the present invention can utilize the same register transfer languages (e.g., VHDL, Verilog, etc.) as clocked designs.

Another advantage of the present invention is that micropipeline processor blocks—such as a binary full adder—are capable of computing a result based on the arrival of only a subset of inputs. That is, for example, a binary adder's carry output can be determined without waiting for arrival of a carry-in value if the two data operands are both logical "0" values or both logical "1" values.

Further features and advantages of the present invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements.

DETAILED DESCRIPTION

The present invention is directed to a system and method for early evaluation in micropipeline processors to improve performance.

Figure 1:
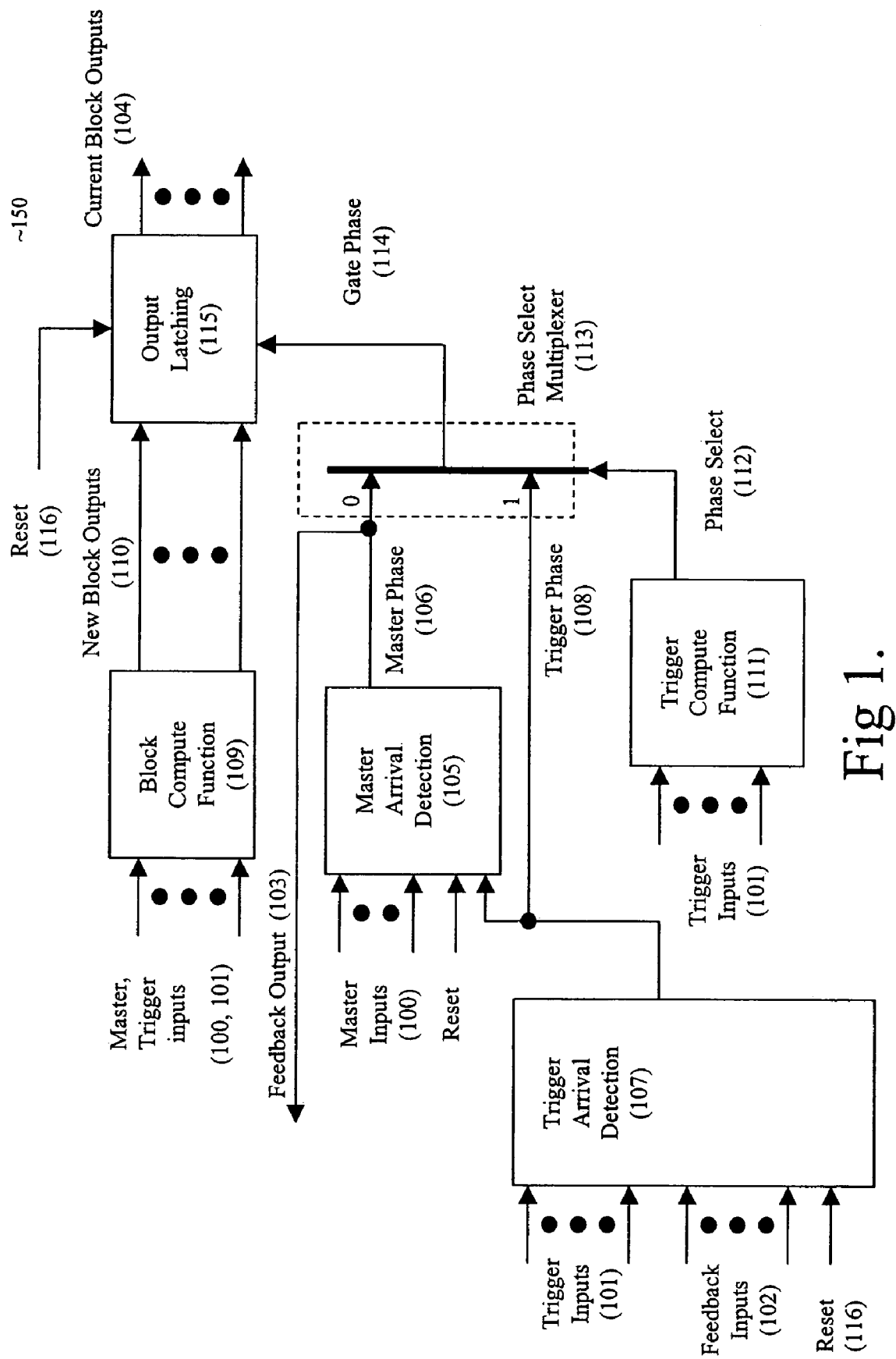
FIG. 1 is a block diagram of a general phased logic block with early evaluation capabilities, according to an embodiment of the present invention.

Referring to FIG. 1, a block diagram of a logic circuit 150 according to an embodiment of the present invention is shown. More specifically, logic circuit 150 is a self-timed logic block (i.e., a micropipeline) having the early evaluation capabilities according to an embodiment of the present invention. As will be appreciated by those skilled in the relevant art(s) after reading the description herein, logic circuit 150 is a general representation of a logic circuit and the description below is generally applicable to bundled data signaling and LEDR signaling. In sum, the early evaluation of the present invention updates the outputs of self-timed logic circuit 150 after a subset of the circuit's inputs have arrived and a trigger compute function logic block evaluates to true.

In an embodiment, logic circuit 150 includes three sets of inputs: one or more master inputs 100, one or more trigger inputs 101, and one or more feedback inputs 102. In an embodiment, logic circuit 150 includes two outputs: a feedback output 103, and one or more current block outputs 104.

In an embodiment, trigger arrival detection logic block 107 is used to detect the arrival of the trigger input signals 101 and feedback input signals 102. A trigger phase signal 108 is asserted upon arrival of trigger input signals 101 and feedback input signals 102.

A master arrival detection logic block 105 is used to detect the arrival of the master inputs signal 100 and trigger phase signal 108. A master phase signal 106 is asserted upon arrival of the master inputs 100 and trigger phase signals 108. Feedback output 103 is asserted when master phase signal 106 is asserted.

In an embodiment, block compute function logic block 109 is used to compute the values of the new block outputs 110 from the master inputs 100 and trigger inputs 101. A trigger compute function logic block 111 is used to compute the value of the phase select signal 112. The phase select signal 112 is then used by the phase select multiplexer 113 to select the value of the gate phase signal 114 from either the master phase signal 106 or trigger phase signal 108. The assertion of gate phase signal 114 causes an output latching logic block 115 to transfer new block output 110 values to current block output 104 values.

In an embodiment, a reset input 116 is used to provide initialization for master arrival detection logic block 105, trigger arrival detection logic block 107, and output latching logic block 115.

Figure 2:
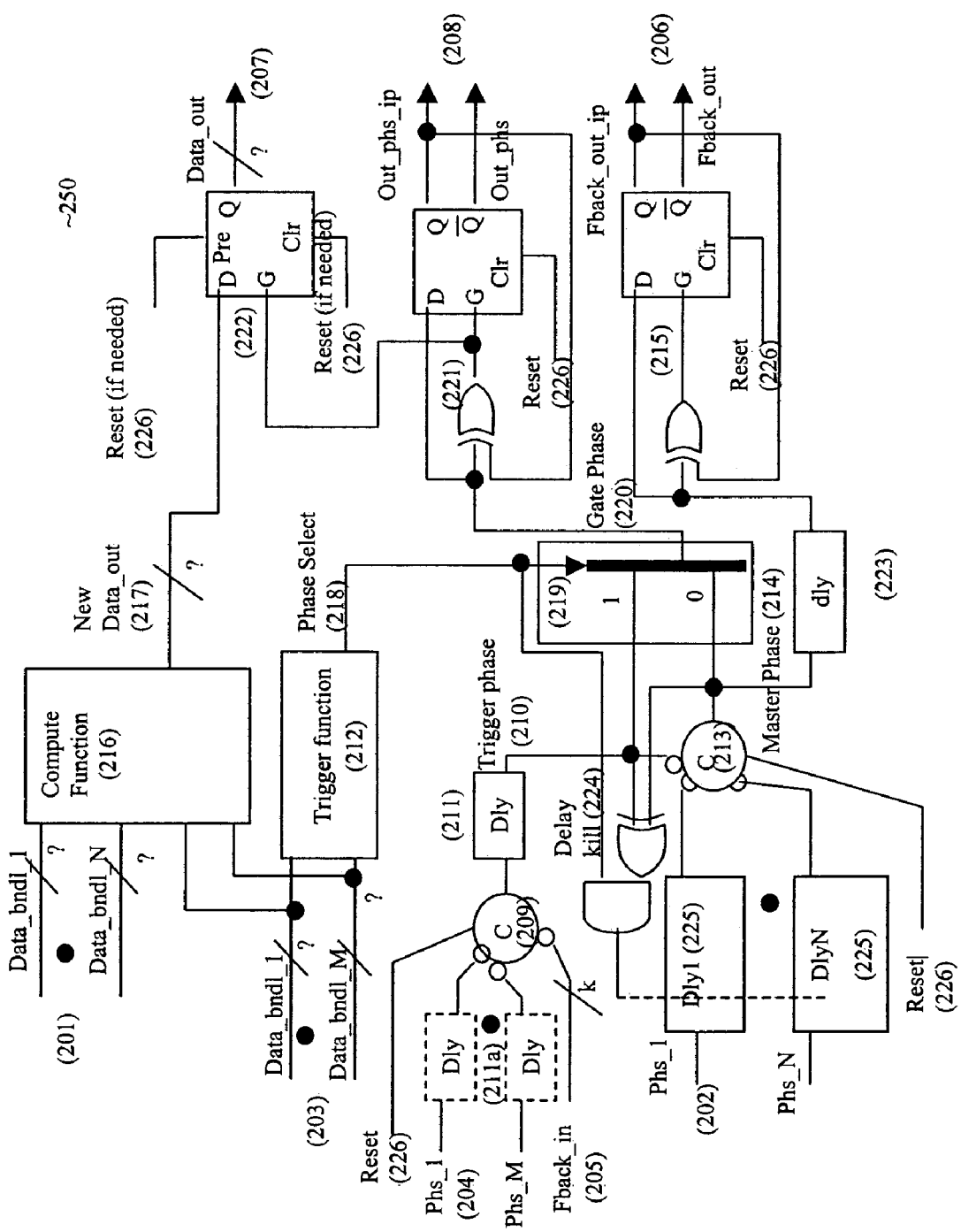
FIG. 2 is a block diagram of a phased logic block with early evaluation capabilities that uses bundled-data signaling for inputs and output in one embodiment of the present invention.

Referring to FIG. 2, a block diagram of a logic circuit 250 is shown. More specifically, logic circuit 250 is a self-timed logic block that uses bundled data signaling for inputs and the output, and having the early evaluation capabilities according to an embodiment of the present invention. Early evaluation updates the outputs of self-timed logic block 250 after a subset of the block's inputs have arrived and a trigger compute function logic block evaluates to true.

In an embodiment, circuit 250 includes three sets of inputs: one or more master input bundles, each master input bundle being comprised of a set of master input data wires 201 and a corresponding master phase wire 202; one or more trigger input bundles, each trigger input bundle being comprised of a set of trigger input data wires 203 and a corresponding trigger phase wire 204; and one or more feedback inputs 205.

In an embodiment, logic circuit 250 includes the following sets of outputs: an inverted and non-inverted feedback output 206; and an output bundle consisting of a set of data wires 207, and an inverted and non-inverted phase signal 208.

In an embodiment, logic circuit 250 further includes a trigger arrival Muller C-element 209 that is used to detect the arrival of the trigger phase wire signal 204 and feedback input signals 205. A trigger phase signal 210 is toggled upon arrival of trigger input phase wire signal 204 and feedback input signals 205. A trigger delay block 211 is used to match the delay of the trigger input phase wire signal 204 with the delay of the trigger function computation logic block 212. In an alternate embodiment, individual trigger delay blocks 211a are used on the inputs of the Muller C-element 209 instead of a single trigger delay block 211 afterwards (as shown by the dotted lined in FIG. 2).

In an embodiment, a master arrival Muller C-element 213 is used to detect the arrival of master phase wires 202 and trigger phase signal 210. A master phase signal 214 is asserted upon arrival of the master phase wire signal 202 and trigger phase signal 210. A feedback output latch circuitry 215 causes the inverted and non-inverted feedback output 206 to be updated when the master phase signal 202 changes state.

In an embodiment, a block compute function logic block 216 is used to compute the values of the new block data outputs 217 from the master data inputs 201 and trigger data inputs 203. Trigger compute function logic block 212 is used to compute the value of the phase select signal 218. Phase select signal 218 is used by phase select multiplexer 219 to select the value of a gate phase signal 220 from either the master phase signal 202 or trigger phase signal 204. The assertion of gate phase signal 220 causes an output phase-latching logic block 221 and a data-latching logic block 222 to update the output phase wire 208 and data output wires 207, respectively.

In an embodiment, a delay block 223 on the path of master phase signal 214 is used to gate inverted and non-inverted feedback output 206, and also is used to match the delay in the feedback output 206 gating path with the delay in the output phase signal 208 path. This prevents the feedback output phase signal 206 from changing before the output phase signal 208 changes.

In an embodiment, a delay kill logic block 224 is used to reduce the delay in the master input delay blocks 225 whenever an early fire is performed. The master input delay blocks 225 are used to match this control path delay with the corresponding data path delay in the master compute function logic block 216. This delay can be reduced in the event of an early fire because the output value 207 has already been updated.

In an embodiment, a reset input 226 is used to provide initialization for Muller C-elements 209 and 213, output phase-latching logic block 221, data-latching logic block 222 and feedback output latch circuitry 215.

Figure 3:
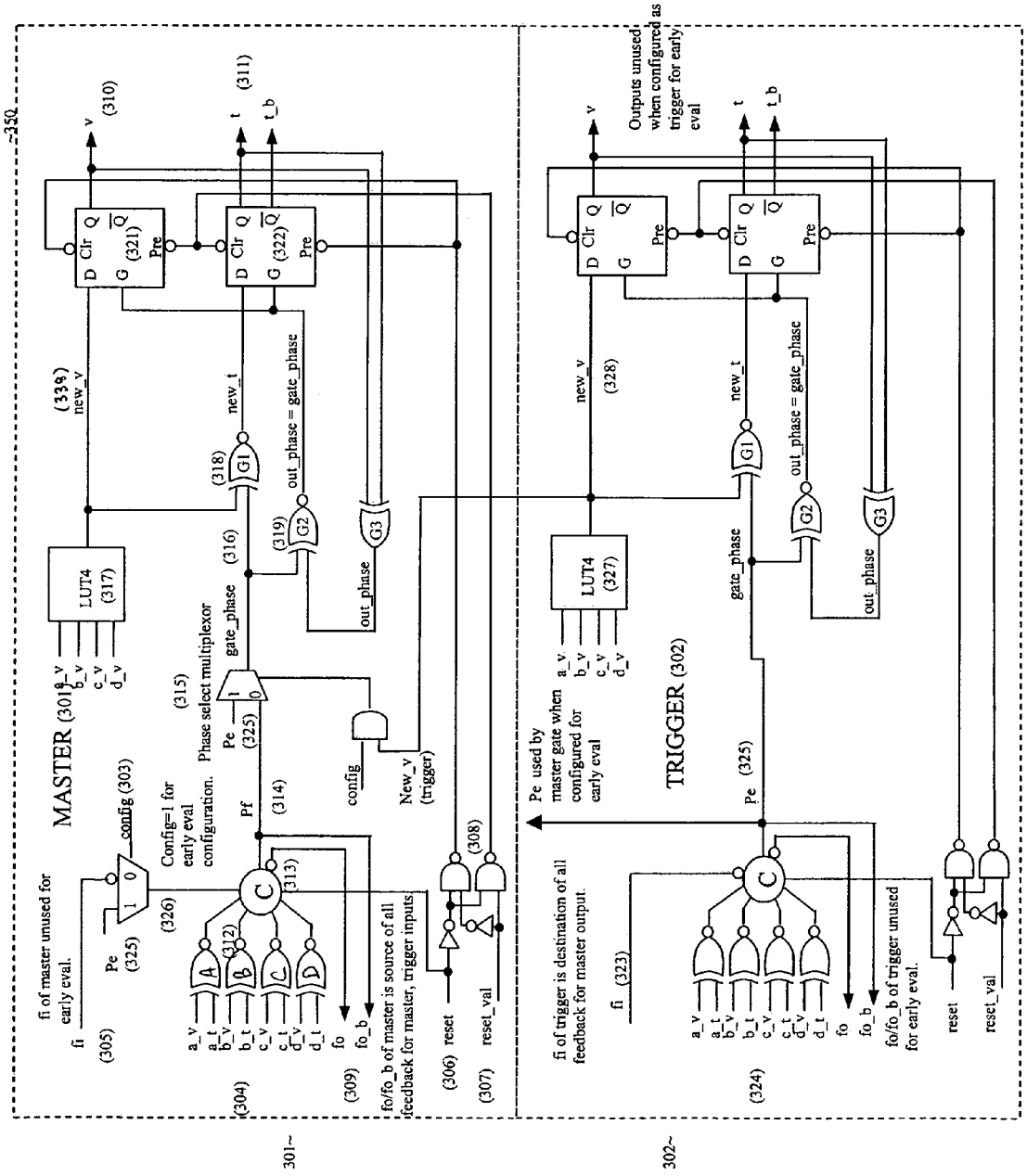
FIG. 3 is a block diagram of a phased logic block with early evaluation capabilities that uses LEDR signaling for inputs and output in one embodiment of the present invention.

Referring to FIG. 3, a block diagram of a coarse grain logic circuit 350 is shown. More specifically, logic circuit 350 is a self-timed logic block that uses LEDR signaling for the inputs and for the output. In alternate embodiments, circuit 350 is configured as two separate phased logic gates with no early evaluation, or as one phased logic gate having the early evaluation capabilities according to an embodiment of the present invention.

In an embodiment, circuit 350 is composed of two separate blocks—a master block 301 and a trigger block 302. When operating as two separate PL gates with no early evaluation, a configuration ("config") signal 303 is set to a "0" value. This causes master block 301 to ignore all signals from trigger block 302. In this mode of operation, each gate functions independently of each other.

In an embodiment, the operation of master block 301 in non-early evaluation mode is functionally equivalent to trigger block 302, so only a description of the master block is given below for non-early evaluation operation.

Master block 301 contains three sets of inputs. The first input set includes four LEDR inputs 304 (labeled "A", "B", "C", and "D" in FIG. 3). Each LEDR input 304 consists of two wires—a _v wire which is the value signal; and a _t wire which is the timing signal.

The second set of inputs within master block 301 is a feedback input ("fi") signal 305. The third set of inputs within master block 301 is a reset input signal 306 which resets the state of a Muller C-element 313. A reset signal—reset_val signal 307—and associated logic 308 is used to reset or preset the state of a value output latch 321 and a timing output latch 322.

Master block 301 contains the following outputs: inverted and non-inverted feedback outputs 309; and a LEDR output consisting of two wires—a _v wire 310 which is the value signal and inverted and non-inverted _t wires 311 which are the timing signals.

In an embodiment, XNOR gates 312 on the LEDR inputs are used to convert each _v, _t signal pair to a single signal that toggles for each new input phase arrival. Muller C-element 313 within master block 301 is then used to detect the arrival of all master LEDR inputs 304 and feedback input 305, which causes a master phase "Pf" signal 314 to toggle after all inputs have arrived.

Because config signal 303 is a "0" in the non-early evaluation mode, a Phase Select multiplexer 315 will pass the master phase signal 314 to a gate phase signal 316. A master four-input lookup table ("LUT4") 317 computes a new value 338 for master block 301 based on the value bits of the master LEDR inputs 304. The output latching circuitry (represented by gates "G1" 318, "G2" 319, and "G3" 320) will cause value output latch 321 and timing output latch 322 to be updated with the correct values based upon the state of the new value "new_v" signal 338 and gate phase signal 316.

In early evaluation mode, master block 301 and trigger block 302 form one PL gate with an early evaluation capability according to an embodiment of the present invention. In early evaluation mode, config signal 303 is a "1" value, and the feedback for logic circuit 350 is assumed to be the feedback input ("fi") signal 323 of trigger block 302. LEDR inputs 324 of trigger block 302 are the early arriving signals for PL gate 350.

The toggling of "early phase" Pe signal 325 indicates the arrival of all trigger LEDR inputs 324 and feedback input 323. A multiplexer 327 is used to pass Pe signal 325 as the fifth input to master block Muller C-element 313 so that it cannot toggle until trigger block 302 has fired and all master inputs 304 have arrived. A four-input lookup table ("LUT4") 327 computes a new_v value 328 for trigger block 302. If new_v value 328 is a "1", then gate phase signal 316 of the master block 301 is set to the trigger phase Pe signal 325. The toggling of the gate phase signal 316 and output latching circuitry (represented by gates "G1" 318, "G2" 319, and "G3" 320) will cause the value output latch 321 and timing output latch 322 to be updated with the correct values based upon the state of new_v signal 338 of master block 301 and gate phase signal 316.

If the value of new_v signal 328 of trigger block 302 is a "0", then gate phase signal 317 of master block 301 is set to the master phase Pf signal 314. The master phase 314 cannot toggle until the trigger phase 325 toggles and all LEDR master inputs 304 arrive.

Referring again to FIG. 1, the design methodology of an early evaluation PL gate 150, in an embodiment of the present invention, includes the following steps:

(1) Identifying a complete set of inputs (100 and 101) for the early evaluation gate;

(2) Selecting a subset of the set of inputs for which early evaluation can be performed and labeling this subset of inputs as trigger inputs 101;

(3) Selecting the remaining inputs of the set of inputs and labeling this second subset of inputs as master inputs 100;

(4) Specifying and constructing circuitry 111 that implements a first boolean function based upon the value of the trigger inputs 101;

(5) Labeling the output circuitry 111 as the phase select 112.

(6) Identifying a set of inputs from other PL gates that determine when the data output value of gate 150 has been captured by the other PL gates and labeling these inputs as feedback inputs 102;

(7) Construction of circuitry 107 to detect the arrival of the trigger inputs 101 and feedback inputs 102, and labeling the output circuitry 107 as the trigger phase 108;

(8) Specifying and constructing circuitry 109 that implements a second boolean function based upon the value of the master inputs 100 and/or the trigger inputs 101;

(9) Labeling the output of circuitry 109 as the new block outputs 110;

(10) Construction of circuitry 105 to detect the arrival of master inputs 100 and the arrival of the trigger phase 108, and labeling the output of circuitry 105 as the master phase 106 and the feedback outputs 103;

(11) Construction of circuitry 113 that selects the trigger phase 108 when the phase select 112 output is "1", else selects the master phase 106, and labeling the output of circuitry 113 as the gate phase 114; and

(12) Construction of circuitry 115 that detects the arrival of the gate phase 114, latches both the gate phase and the new block outputs 110, and labeling the output of the circuitry 115 as the current block outputs 104.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. An early evaluation, self-timed phased logic gate, comprising:
    a block compute function;
    a master arrival detection function that is configured to output a feedback output;
    a trigger compute function;
    a trigger arrival detection function;
    a plurality of input conductors for conducting a plurality of inputs; and
    at least one block output;
    wherein said block compute function is configured to update said at least one block output upon the arrival of only a subset of said plurality of inputs as indicated by said trigger detection function when said trigger compute function evaluates to true, and said block compute function is configured to update said at least one block output upon the arrival of all of said plurality of inputs as indicated by said master arrival detection function and said trigger arrival detection function, when said trigger compute function evaluates to false; and wherein said master arrival detection function is configured to update said feedback output upon the arrival of all of said plurality of input.

2. The early evaluation, self-timed phased logic gate of claim 1, wherein bundled signaling is utilized and said at said at least one block output is an output bundle.

3. The early evaluation, self-timed phased logic system of claim 2, wherein said bundle comprises at least one data wire and a phase signal.

4. The early evaluation, self-timed phased logic system of claim 3, wherein said phase signal is inverted.

5. The early evaluation, self-timed phased logic system of claim 3, wherein said phase signal is non-inverted.

6. The early evaluation, self-timed phased logic gate of claim 1, wherein Level Encoded Duel Rail (LEDR) signaling is utilized and said at least one block output is a LEDR output comprising a value signal wire and a timing signal wire.

7. The early evaluation, self-timed phased logic system of claim 6, wherein said LEDR output timing signal wire is inverted.

8. The early evaluation, self-timed phased logic system of claim 6, wherein said LEDR output timing signal wire is non-inverted.

9. The early evaluation, self-timed phased logic gate of claim 1, wherein said plurality of inputs includes at least one of the following signals a master input; a trigger input; and a feedback input.

10. The early evaluation, self-timed phased logic gate of claim 1, wherein said at least one block output is one of the following signals: a feedback output; and a current block output.

11. The early evaluation, self-timed phased logic gate of claim 1, wherein said trigger arrival detection function produces a trigger phase signal upon detecting the arrival of a trigger input signal and a feedback input signal from among said plurality of inputs.

12. The early evaluation, self-timed phased logic gate of claim 11, wherein said master arrival detection function produces a master phase signal upon detecting the arrival of a master input signal and said trigger phase signal.

13. The early evaluation, self-timed phased logic gate of claim 12, wherein said block compute function produces said at least one block output from said master input signal.

14. The early evaluation, self-timed phased logic gate of claim 12, wherein said block compute function produces said at least one block output from said master input signal and said trigger input signal.

15. The early evaluation, self-timed phased logic gate of claim 12, wherein:
    said trigger compute function computes the value of a phase select signal;
    said phase select signal is used by a phase select multiplexer to select the value of a phase signal from either said master phase signal or said trigger phase signal; and
    said phase signal causes said block compute function to update the value of said at least one block output.

16. A method for constructing an early evaluation, self-timed phased logic gate having a set of inputs and at least one current block output, said method comprising the steps of:

selecting a subset of the set of inputs for which early evaluation can be performed as trigger inputs, wherein the remainder of the set of inputs are master inputs;

constructing a first circuitry set configured to implement a first boolean function based upon the value of said trigger inputs, wherein the output of said first circuitry set is a phase select signal;

constructing a second circuitry set configured to detect the arrival of said trigger inputs, wherein the output of said second circuitry set is a trigger phase original;

constructing a third circuitry set configured to implement a second boolean function based upon the value of at least said master inputs, wherein the output of said third circuitry set is at least one new block output;

constructing a fourth circuitry set configured to detect the arrival of said master inputs and said trigger phase signal, and outputs a master phase signal which acts as a feedback output, when all of the master inputs and the trigger phase signal have arrived, constructing a fifth circuitry set configured to select said trigger phase when said phase select signal is a first value, and capable of selecting said master phase when said phase select is a second value, wherein the output of said fifth circuitry set is a gate phase signal; and constructing a sixth circuitry set configured to detect the arrival of said gate phase signal and latch said gate phase signal and said at least one new block output, wherein the output of said sixth circuitry set is the at least one current block output.

17. The method of claim 16, wherein said third set of circuitry is configured to update said at least one new block output upon the arrival of only said trigger inputs as indicated by said second set of circuitry and said phase select signal being equal to said first value.

18. The method of claim 16, wherein said third set of circuitry is configured to update said at least one new block output upon the arrival of all inputs within the set of inputs, as indicated by said second and sixth sets of circuitry, and upon said phase select signal being equal to said second value.

19. The method of claim 16, wherein bundled signaling is utilized and the at least one current block output is an output bundle.

20. The method of claim 16, wherein Level Encoded Dual Rail (LEDR) signaling is utilized and the at least one current block output is a LEDR output comprising a value signal wire and a timing signal wire.

* * * * *